United States Patent [19]
Odman

[11] 3,816,898
[45] June 18, 1974

[54] APPARATUS FOR ARRANGING AND SOLDERING TOGETHER ELECTRODE SETS FOR LEAD ACCUMULATORS

[75] Inventor: Tor Axel Odman, Stockholm, Sweden

[73] Assignee: Aktiebolaget Tudor, Stockholm, Sweden

[22] Filed: Feb. 2, 1973

[21] Appl. No.: 329,146

Related U.S. Application Data

[62] Division of Ser. No. 207,336, Dec. 13, 1971, Pat. No. 3,734,167.

[52] U.S. Cl. .................................................. 29/204
[51] Int. Cl. ......................................... H01m 35/00
[58] Field of Search .. 29/204, 204 D, 208 R, 203 P, 29/200 P

[56] References Cited
UNITED STATES PATENTS
3,609,847  10/1971  Engler................................. 29/204

Primary Examiner—Thomas H. Eager
Attorney, Agent, or Firm—Burns, Doane, Swecker & Mathis

[57] ABSTRACT

Apparatus for producing finished plate sets constituting a cell in a lead-acid accumulator. Positive and negative plate electrodes and separator sheets, in proper sequence and number, are fed in at station A, arranged and adjusted positionally relative to one another at station B, and inverted so that the plate lugs are fluxed at station C. The lugs are inserted into mold troughs carried by a lower chain system at station D, and the pole bridges with connecting terminals or external terminal posts formed integrally therewith during the travel to station E, after which the mold troughs are removed and the finished plate set is removed as a sub-assembly at station F.

5 Claims, 18 Drawing Figures

APPARATUS FOR ARRANGING AND SOLDERING TOGETHER ELECTRODE SETS FOR LEAD ACCUMULATORS

This is a division of application Ser. No. 207,336, filed Dec. 13, 1971 now U.S. Pat. No. 3,734,167.

This invention relates to apparatus used for arranging and soldering together electrode plate sets for lead-acid electric accumulators.

The electrode plate sets conventionally comprise a group of positive and negative plate electrodes closely spaced to each other. In fabricating an electrode plate set, it is necessary that the requisite number of negative and positive plate electrodes are laid alternately one above the other and separated by sheets of an insulating material that has microporous openings which allow for the circulation of electrolyte between the positive and negative electrodes.

The positive plates in a plate set are all connected together by a pole bridge which connects with lugs on each positive plate. The negative plate electrodes are connected together by a similar pole bridge. These plate lugs are oriented in such a way that the soldering together of the positive or negative lugs, respectively, can take place. Customarily, the positive plate lugs are located near the upper edge at one side of the plate set, while the negative plate lugs are located at the other side of the upper edge of the plate set.

The separator sheets usually have a somewhat larger area than the plates so that the edges of the separator sheets project beyond the edges of the electrode plates over the whole extent of the electrode plate so as to prevent short-circuiting. During manufacture of the plate sets as a sub-assembly, the problem has always arisen of locating the plates and separators in the correct position so that the marginal edges are properly located relative to one another. In the past, complicated fitting jigs and fixtures have been used to enable this operation to be carried out.

Even after the electrode plate set components are arranged and located properly relative to one another, there still remains the step of providing the pole bridge and associated terminal with each lug set.

It is a major object of the present invention to provide a novel apparatus for automatically forming on the plate lugs the necessary pole bridge and connectors.

A further object of the invention is to provide a novel apparatus wherein the positive and negative plates and separator sheets may be laid alternately, one above the other, on a plate set holder, and thereafter the necessary adjustments are made for arranging the marginal edges of the electrodes and separator sheets during the course of operation of the machine.

A still further object of the invention resides in providing a novel machine wherein the assembled electrode plate sets are inverted to be passed through a flux station and into a traveling mold through wherein the respective pole bridges and terminals are formed as the plate set passes through the machine.

Another object is to provide a novel mold trough arrangement wherein the molten lead alloy which serves as the pole bridge and terminal is poured into the mold trough over an inclined plane in such way as to avoid burning of the plate electrode lugs and to assure a good electrical and mechanical connection thereto.

These and other objects of the invention will become more fully apparent from the claims and from the description as it proceeds in connection with the appended drawings wherein:

Lead-acid accumulators of the type having parallel positive and negative plate electrodes and a liquid electrolyte are well known. In each cell, a group of three or more positive electrodes are joined together by pole bridges which customarily consist of a body of lead or lead alloy having a substantial cross-sectional area to provide a low electrical resistance to current flow between the electrodes and the pole bridge terminals. An equal number of negative electrodes are similarly joined by negative pole bridges. The electrodes are kept from contacting one another by separators which usually comprise a microporous sheet of material having a good resistance against destruction due to movement of the abutting electrodes.

The positive and negative electrodes may be of the type disclosed in U. S. Pat. No. 3,296,028. A typical prior art separator sheet is disclosed in U. S. Pat. No. 3,055,966. The positive and negative electrodes and separator sheets are joined together as a unitary, rigid sub-assembly and serve as one cell of a multiple-cell battery, as shown for example in U. S. Pat. No. 3,484,299.

Figure 1:
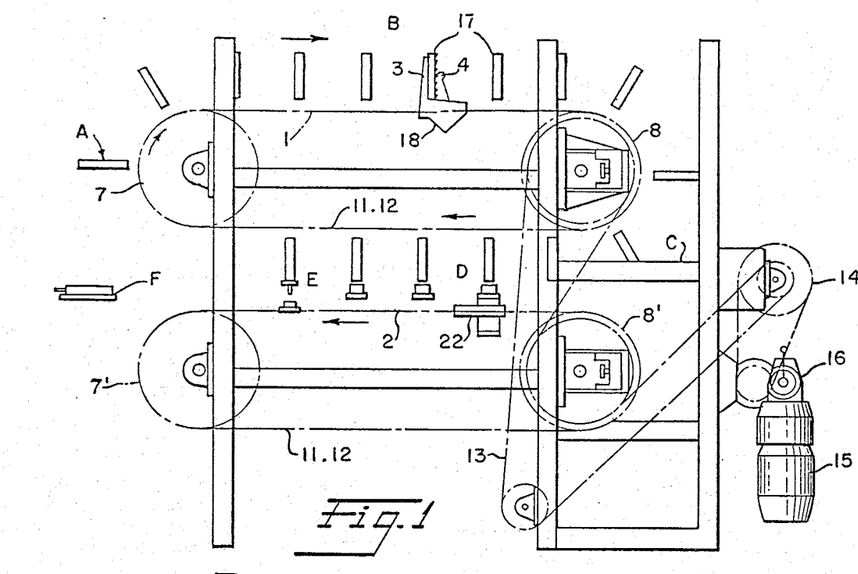
FIG. 1 is a front view diagrammatically showing the apparatus of the present invention.
Figure 2:
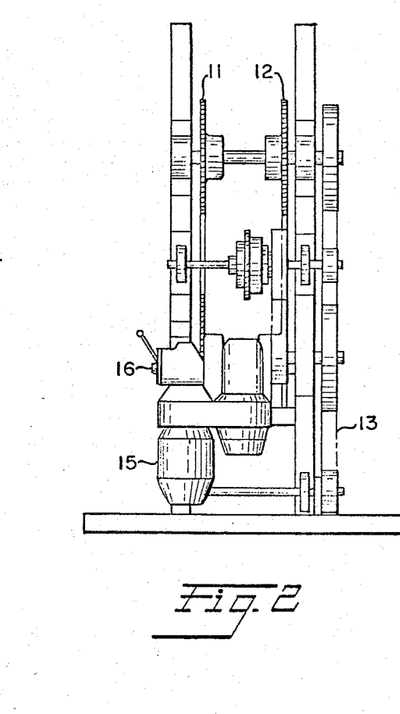
FIG. 2 is a right end view of FIG. 1.
Figure 3:
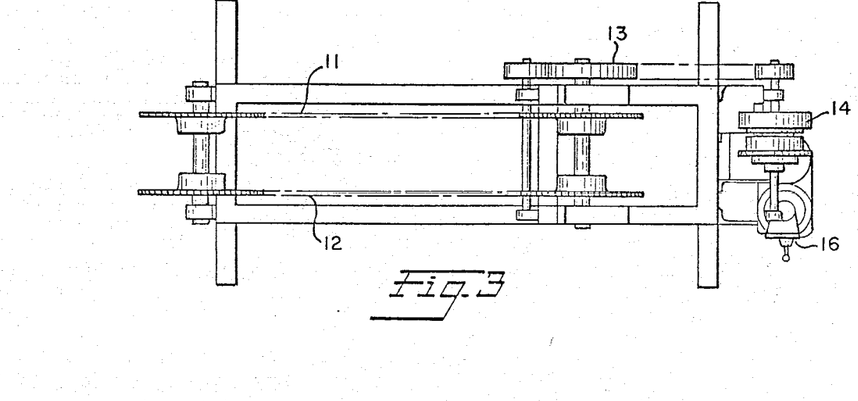
FIG. 3 is a top plan view of FIG. 1.

Referring now to FIGS. 1–3, and more particularly to FIG. 1 which shows diagrammatically several vertical and horizontal frame members for supporting an upper sprocket wheel pair 7 and 8 and a lower sprocket wheel pair 7' and 8', the upper sprocket wheels 7 and 8 drive a continuous chain system 1 which has connected thereto a plurality of cell sub-assembly holders 18. Only one such cell subassembly holder 18 is illustrated in FIG. 1 for purposes of simplification of the drawings. In actual practice, a separate holder 18 is provided for each cell sub-assembly. The chain system 1 moves the cell sub-assembly holders 18 from station A illustrated in FIG. 1 in a direction as indicated by the arrows on FIG. 1 around sprocket 8 and along the lower length of chain 11, at which time the cell subassembly holder 18 is in an inverted position. The cell sub-assembly holder 18 is illustrated in greater detail in FIG. 14 where it is there shown in this inverted position. The cell subassembly holder 18 essentially consists of a plate support arm 3 and a movable holding member 4 which hold the electrodes and separators of the cell sub-assembly 17 in place on the cell sub-assembly holder 18 during the time the cell sub-assembly traverses along the lower path of the chain system 1, at which time it is in its inverted position.

Referring now to FIG. 1, at station A when a plate holder 18 is at its horizontal position, the positive and negative electrodes with the separators therebetween are laid on the plate support arm 3. As the upper chain system 1 advances, the cell sub-assembly moves to station B and thereafter through stations C, D, and E to a final station F where the sub-assembly is removed from the machine.

A lower chain system 2 carries a plurality of holders 22 for casting molds, which will be described below. Both chain systems 1 and 2 are of like construction with the two chains traveling concomitantly through a single drive system shown in FIG. 1 as including a motor 15, an intermittent drive mechanism 16, and drive chain 13 which interconnects the upper chain system 1 and the lower chain system 2 with sprocket wheel which is driven by drive chain 14. Chain 13 does not operate continuously but instead advances the chain systems 1 and 2 a distance equal in length to the distance between two adjacent cell sub-assembly holders 18 during a given time and thereafter stands still for about one-third of this time. During the standstill period, a number of actions take place, which will be described below.

With continued reference to FIGS. 1 through 3, the positive and negative electrodes and separators which constitute the cell sub-assembly 17 are fed as separate elements into the machine when a holder 18 is in a substantially horizontal position, as illustrated at station A in FIG. 1. The marginal edges need not be accurately aligned. The cell sub-assembly elements follow the chain system 1 over sprocket 7 to station B where the electrodes and separators are standing on their bottom edges with lugs 19 and 19', which are conventionally formed on the positive and negative electrodes on opposite sides, respectively, of the top edge of the electrodes, extending upwardly as illustrated in FIG. 4.

Figure 4:
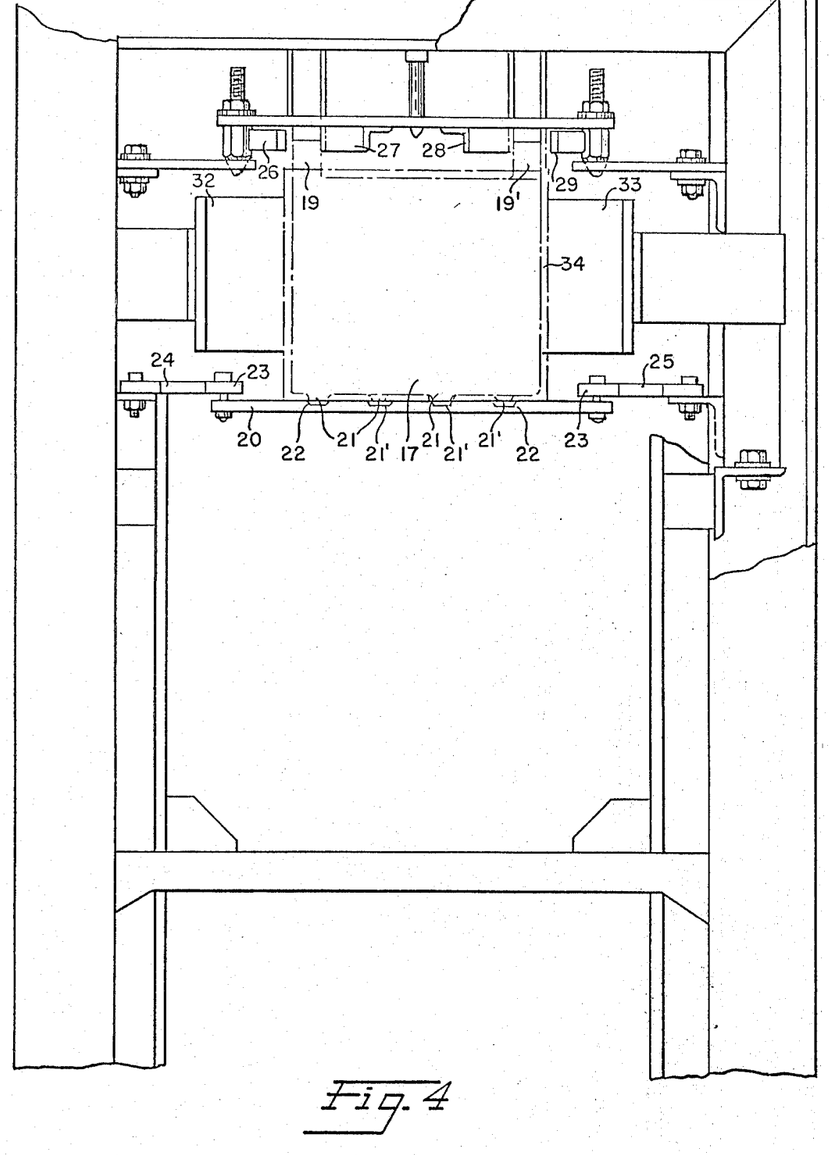
FIG. 4 is a left end view to an enlarged scale of the upper portion of the apparatus of FIG. 1 when the electrode plates and the separator are aligned.
Figure 5:
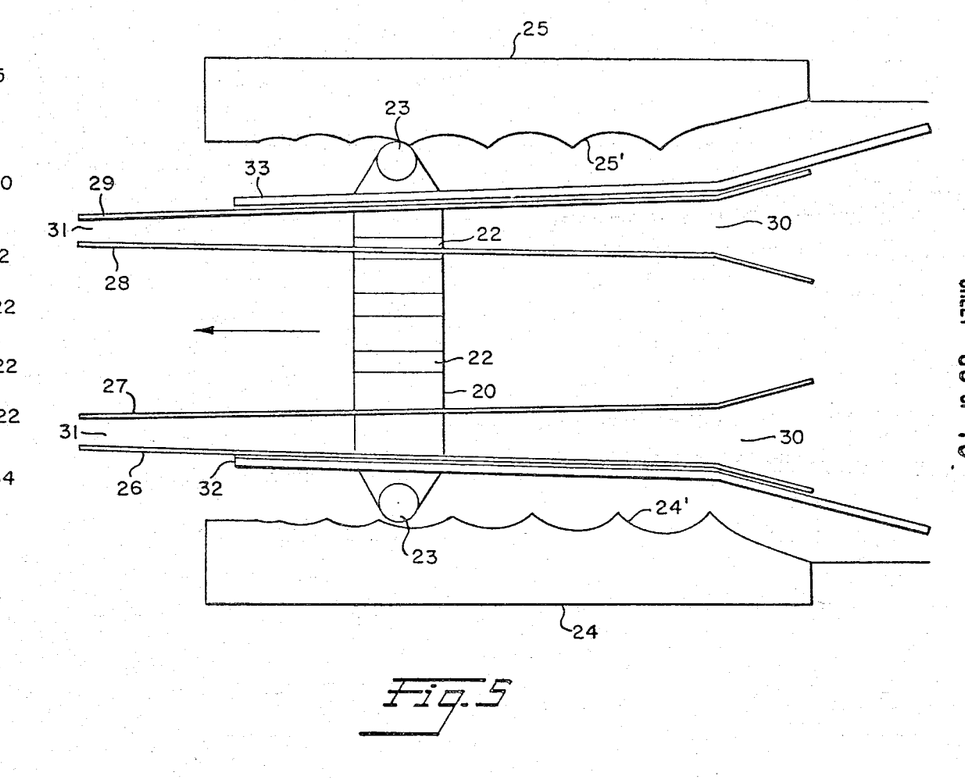
FIG. 5 is a top view of that portion of the apparatus shown in FIG. 4 with the arrow indicating the direction of movement of the electrode plate assembly.
Figure 6:
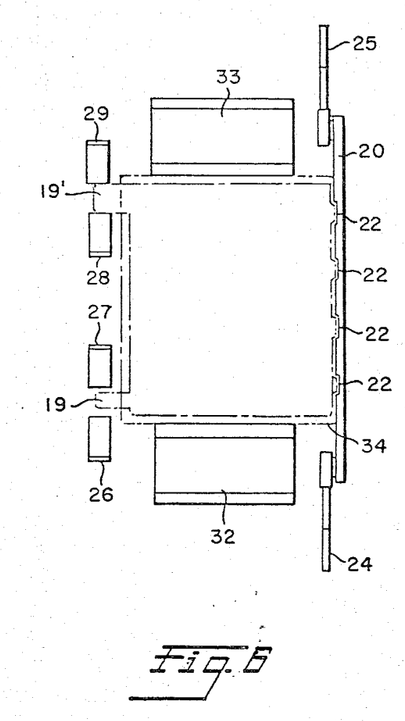
FIG. 6 is a right end view of the apparatus shown in FIG. 5.

At station B is a plate adjusting mechanism which is illustrated in FIGS. 4 through 6. This adjusting mechanism arranges and aligns the electrodes and the separators into the correct position in relation to one another. When the electrodes and separators leave station B in their upright position, they are gripped firmly by movable holding member 4 and conveyed over sprocket 8, after which they are turned over into an inverted position with lugs 19 and 19' extending downwardly as the lugs pass into station C.

With continued reference to FIGS. 4 through 6, which show the adjusting mechanism fixedly located at station B, the electrodes are delivered to the in-feed side of station B in a vertical plane and are oriented so that the large electrode area faces the direction of movement. Since the marginal edges of the electrodes and separators are not aligned at the time of being fed into the machine at station A, it is necessary to effect a lateral adjusting movement of the plates and separators relative to each other in a direction transverse to the direction of the travel of the holders 18 and the chain system 1. At station B, the electrodes and separators are not held tightly in the holder 18, but instead rest between plate support arm 3 and movable holding member 4 which are like loose jaws. The plates and separators are supported on baseplate 20 of the holder 18, which is shown in FIGS. 4, 5, and 6. The electrodes, having lugs 19 on their upper edges, have projections 21 on their lower edges, and the electrodes having lugs 19' have similar projections 21'. The baseplate 20 is provided with four parallel grooves 22 which are designed to catch the projections 21 and 22' during the transverse movement of baseplate 20 at station B. It will be apparent, however, that the electrodes could have grooves and baseplate 20 have projections, if desired.

Baseplate 20 is provided with a pair of rollers 23 on opposite sides thereof, the rollers being subjected to the undulations on the inside surfaces of fixed members 24 and 25 located at station B. The chain system 1 moves in the direction of the arrow shown in FIG. 5. The members 24 and 25 have undulations 24' and 25' which act as cam surfaces against which rollers 23 engage. The undulations 24' and 25' are so constructed that the travel of the movement transverse to the direction of the movement of the chain system 1 is greater at the in-feed side of station B and decreases successively and goes to zero at the end of the adjusting region. During repeated to and fro motion of baseplate 20 transverse to the direction of chain system 1, the projections 21 and 21' of the positive and negative electrodes catch into the grooves 22 in the baseplate 20 to give perfect alignment of the bottoms of the electrodes.

With continued reference to FIGS. 4, 5, and 6, the arrangement of the positive and negative electrodes in relation to one another is further facilitated by the lugs 19 and 19' being controlled during the adjustment procedures by four members 26, 27, 28, and 29 which form wedge-shaped openings 30 which, as shown at the right-hand end of FIG. 5, have relatively wide gaps and gradually taper in conformity with the narrowing of the undulations 24' and 25' in plates 24 and 25 to narrow channels 31 at the left side of FIG. 5. The openings at 31 provide guide surfaces to assure that lugs 19 and 19', and hence the upper portion of the positive and negative electrodes, are properly positioned.

For arranging the separators 34, which are usually thin sheets of firm material, the adjusting mechanism is provided with a pair of side plates 32 and 33, one on each side of the path of the electrodes. The side plates 32 and 33 are located above the baseplate 20 and below the lug adjusting members 26–29. With the movement of the electrode sub-assembly from side to side, as caused by the to and fro movement of baseplate 20, the projecting edges of the separator sheets 34 are pushed transversely into their correct position in the electrode sub-assembly by side plates 32 and 33.

Since the separators 34 are somewhat wider than the electrodes, the side plates 32 and 33 are appropriately positioned. The electrodes are so arranged that the separators 34 extend slightly beyond the outside of the electrodes and preferably by an equal amount on each side. When the cell sub-assembly has completed its travel through the adjusting mechanism shown in FIGS. 4 through 6, then the transverse motion of baseplate 20 cases, and the lugs 19 are passing through channel 31. The cell sub-assembly is then held firmly in the holder 18 with the closure of movable holding member 4 (see FIGS. 1 and 14). Holding member 4 is not released until the cell sub-assembly 17 is removed from the machine at station F.

Figure 7:
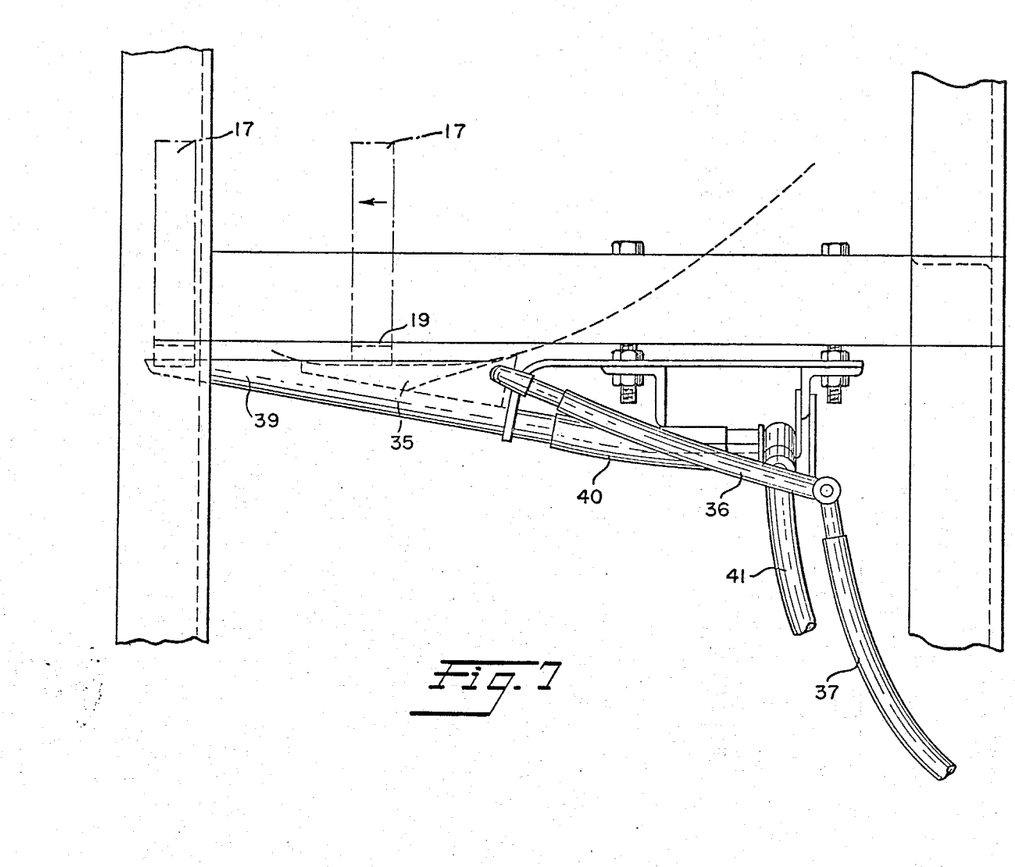
FIG. 7 is a front view of the flux zone.
Figure 8:
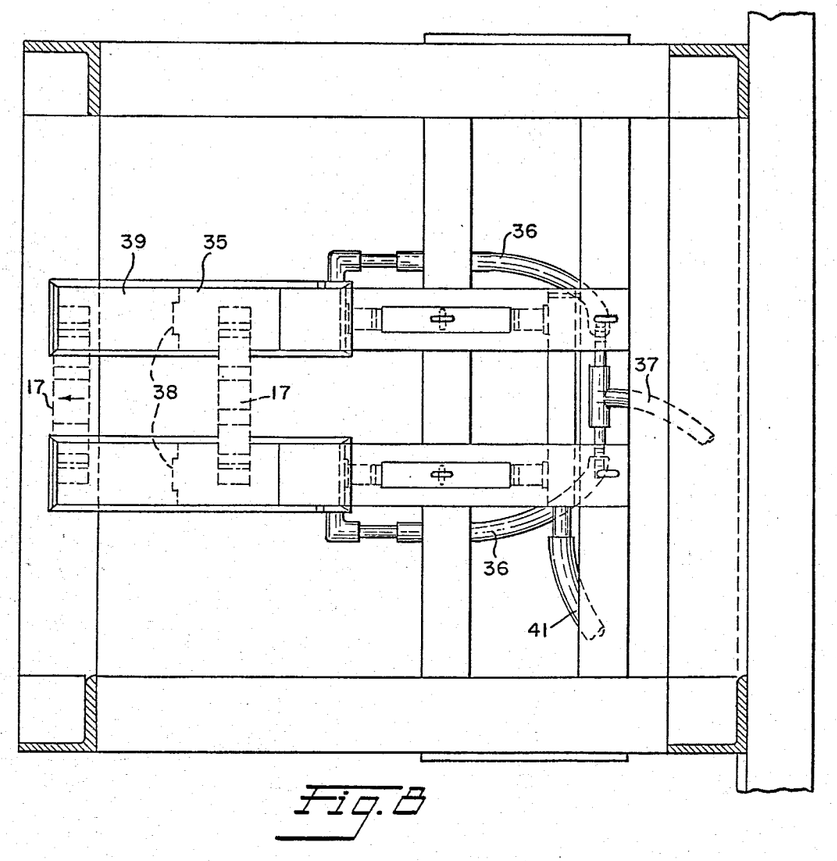
FIG. 8 is a top plan view of the zone shown in FIG. 7.

After leaving station B, the cell sub-assembly 17 in holder 18 is advanced to station C where the lugs are dipped into the flux. The flux station may comprise apparatus as illustrated in FIGS. 7, 8, and 9.

Figure 9:
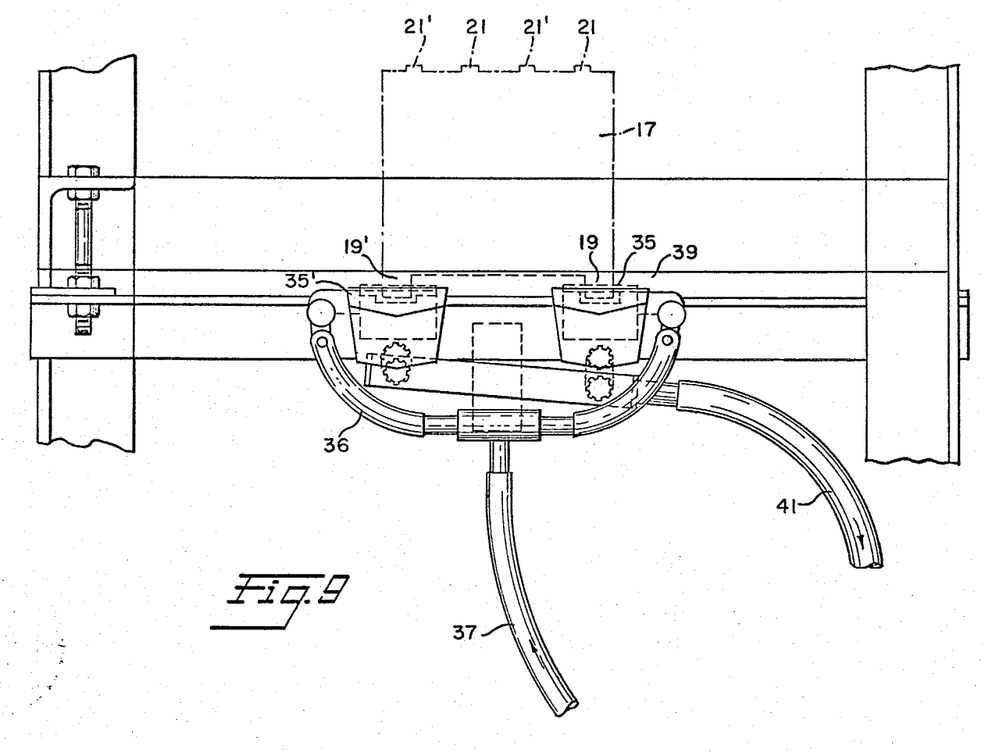
FIG. 9 is a right end view of the zone shown in FIG. 7.

The lugs 19 and 19' extend downwardly, as best shown in FIG. 9. Here and with their continued movement in the beginning of the lower straight stretch, the lugs 19 and 19' dip into troughs 35 and 35' which are filled with flux. Flux is fed continuously through feedpipes 36 from common pipe 37 which is connected to the output side of a pump (not shown).

The free flux surface in troughs 35 and 35' is kept substantially horizontal since the troughs 35 are wide relative to the width of the lugs 19 and 19' and the apertures 38 in the troughs. The width of the apertures 38 is such that the lugs 19 and 19' can pass with some clearance. Flux flows into the outer return troughs 39 and on through discharge pipes 40 and 41 back to a flux reservoir (not shown) to which the pump is connected.

Figure 10:
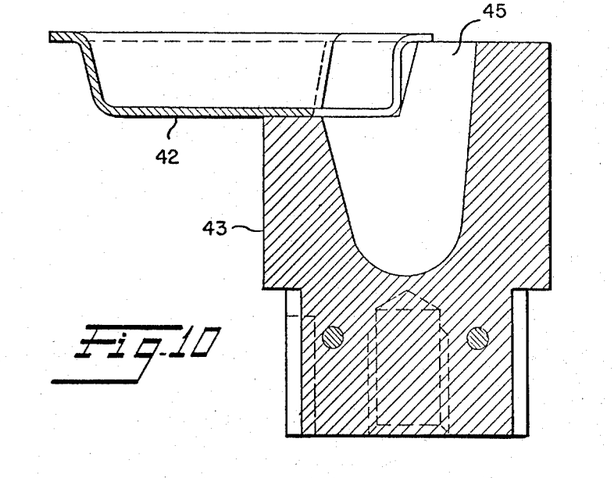
FIG. 10 is a front view of the casting mold for a pole bridge or connecting strap.
Figure 11:
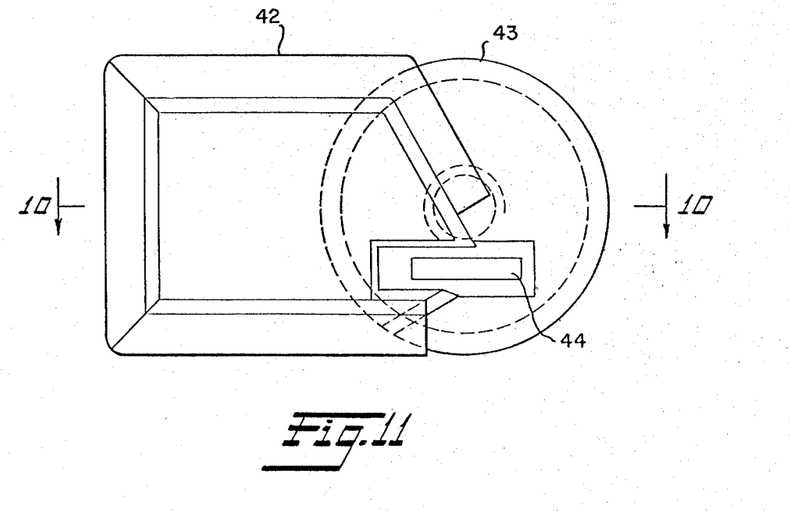
FIG. 11 is a top plan view of the casting mold of FIG. 10.

Referring to FIGS. 10 and 11, casting troughs 42 are illustrated. Casting troughs 42 are carried along with the mating mold component 43 by the casting mold holders 22 shown in FIG. 1. In casting troughs 42, a row of lugs 19 or 19' are soldered together to form what is commonly referred to as "pole bridges." In the illustrated embodiment, a separate casting trough 42, which term is intended to embrace also the mold component 43, is provided on each side of the plate sub-assemblies.

Figure 12:
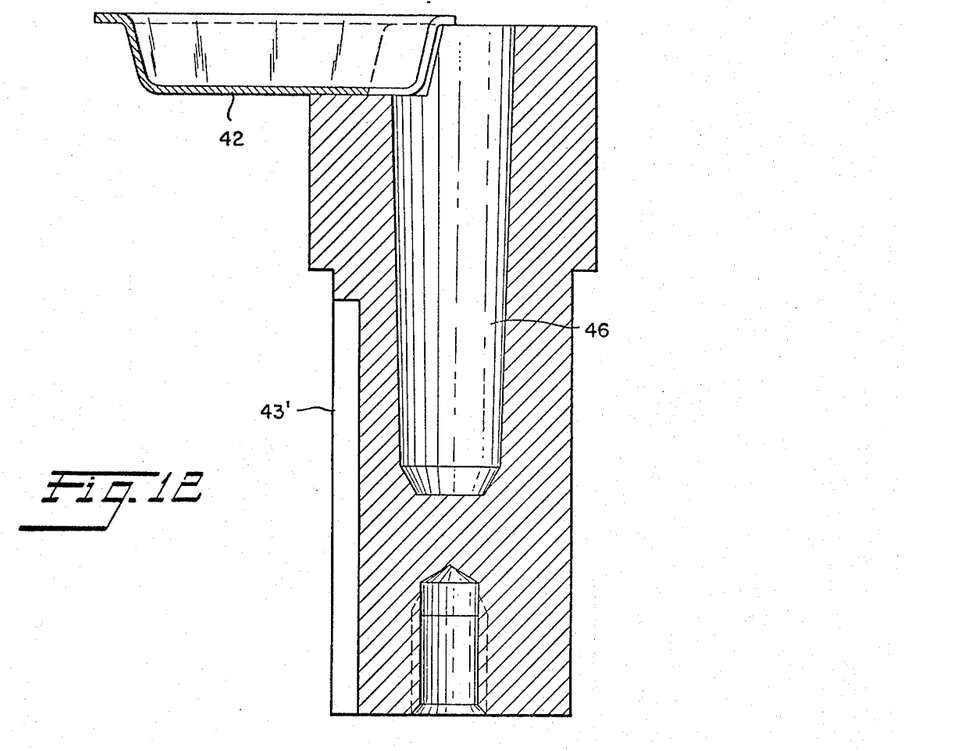
FIGS. 12 and 13 show a casting mold of the same kind as shown in FIGS. 10 and 11, but the connecting parts with pole bridges in this case are formed with a pole adapted to serve as an external battery terminal.
Figure 13:
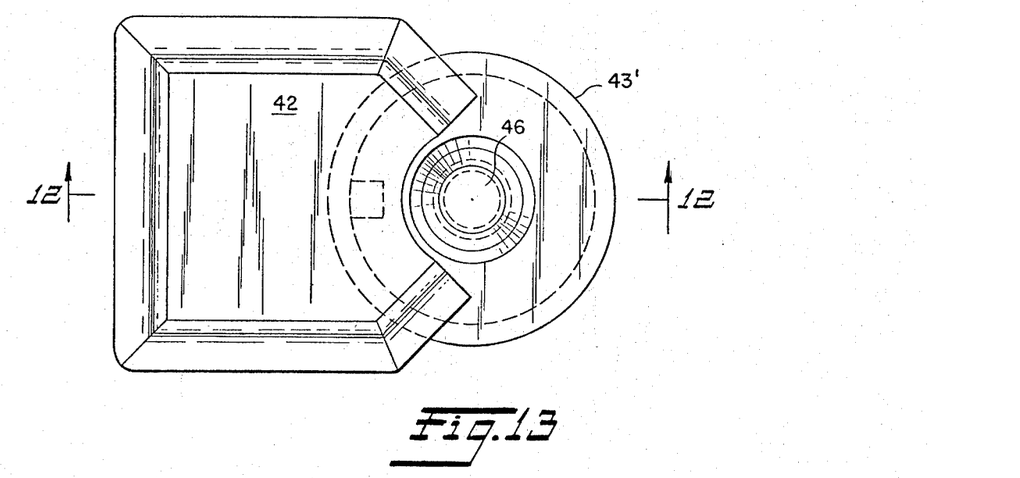

The casting troughs 42 and 42' into which lugs 19 and 19' extend are carried by mold holders 22 and 22' which are driven by chain drive 2 and engagement first occurs at station D (FIG. 1). The pole bridge which connects the respective lugs 19 or 19' on one electrode set is formed in a casting trough 41, as illustrated in FIGS. 10–18. The casting trough 42 is in turn fixedly connected, preferably by means of hard soldering, to the other mold components 43, 44, in which a connector lug 45 is formed, as illustrated in FIGS. 10 and 11. Lug 45 is used as a terminal for connection with another cell in the same battery and may have any desired configuration. A terminal pillar, or external terminal, 46 is formed by the mold, as illustrated in FIGS. 12 and 13.

In either case, the molding trough 42 is the same as is made thin-walled so that the amount of heat required for heating it is comparatively unimportant by comparison with the heat required for a heavy mold with thick walls.

A light, or thin-walled, casting mold 42 made of thin sheet metal in accordance with one of the features of this invention, makes it possible for castings to be produced without considerable heating of the mold. For example, the specific heat in the case of a mold of thin sheet metal is so small that the specific heat of the lead is sufficient both for the heating and for the temperature rise required to take place at the lugs 19 for a satisfactory soldering together to be effected. A casting process which does not require a preliminary heating of the casting mold or trough makes possible a quick starting of the machine, and no extra waiting time is required after a stoppage of work.

The actual casting which mechanically and electrically connects the plate electrodes of the positive electrode set together and the corresponding negative electrode set together by equipping them with a connecting member, known as the "pole bridge," will now be described. When the plate set sub-assembly has passed the flux apparatus at station C, the set holders 18 and the mold holders 22 come in on the common parallel straight stretch at station D in FIG. 1, along which stretch they move concomitantly. The mold troughs 42–43 rise toward the connecting lugs 19 and 19', respectively, of the plate sets 17. Correct relative positioning for casting is achieved, as will be described below.

Figure 14:
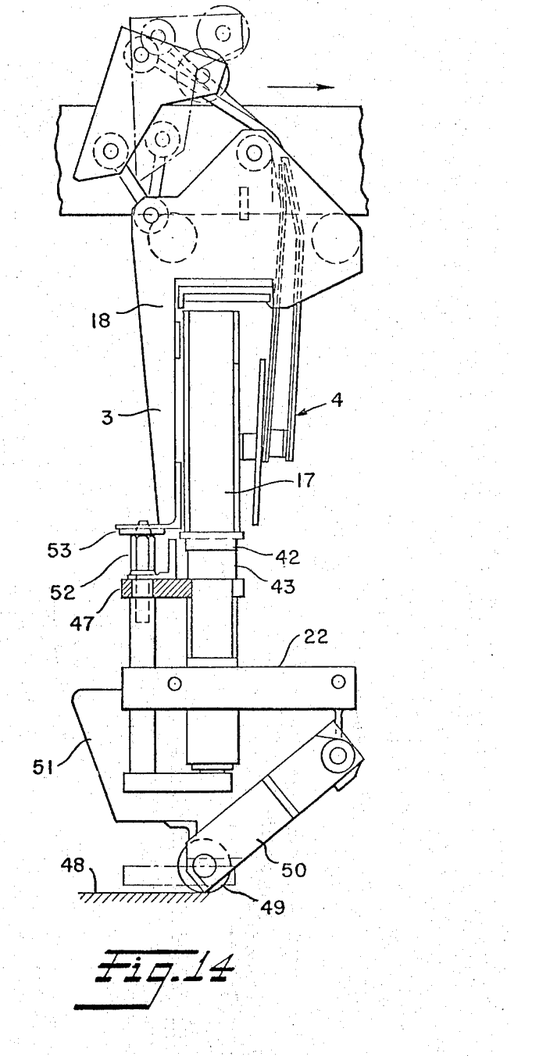
FIG. 14 is a diagrammatic front view of the casting section of the apparatus of the present invention having the electrode plate assembly inverted so that the lugs extend down into the casting mold.
Figure 15:
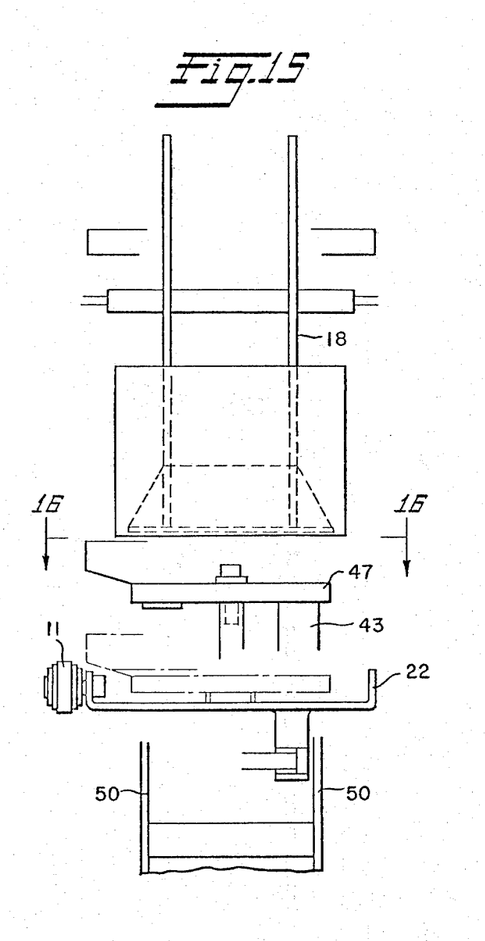
FIG. 15 is a partial left side view of the casting section shown in FIG. 14.
Figure 16:
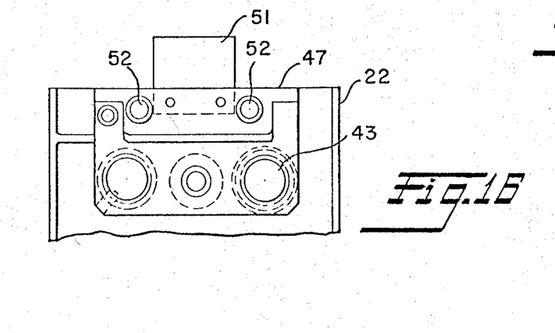
FIG. 16 is a top plan view taken along line 16 of FIG. 15.

With reference to FIGS. 14–16, each mold holder 22 has an indexing member 47 (FIG. 16) with two molds 42 on opposite sides of the electrode sub-assembly and is therefore movable vertically in relation to the fixed cam surface 48 (FIG. 14) which is located adjacent the lower chain system 2. The fixing and raising of the molds is effected by means of a curved member having cam surface 48. The curved member acts on a roller 49 which is supported at the ends of a pair of spaced lifting arms 50 to lift the mold indexing member 47 by means of a spring 51. When the lifting end position is reached, two conical pins 52, carried by indexing member 47, enter two corresponding holes in a plate 53 which is fixedly connected to the set holder 18. The connection between the holder 18 and the mold trough 42 is thereby held fast and fixed during the advancement of the chain systems 1 and 2 from the casting station D until the mold trough 42 drops away at station E. The vertical position of the mold trough 42, which starts in relation to the lugs 19 and 19' of the plate set sub-assembly, is controlled in the illustrated example by adjusting the height of the conical pins 52; this adjustment controls the distance between the ends of the contact lugs 19 and 19' and the bottom of their respective mold trough 42, as desired.

Lead is fed from melting pots into the molding trough 42 along a side edge, preferably on each side of the machine. The melting pots are provided with a pipe 54 (FIG. 18) which extends from the pot (not shown) as far as the mold trough 42 A needle valve (not shown), acted on by a magnet in a known manner, opens the connection between the pot and the pipe, and the times of opening are so set that the correct quantity of lead is supplied to the different mold troughs 42.

Figure 17:
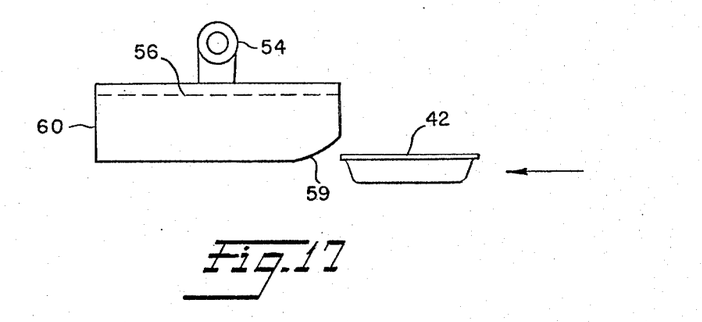
FIGS. 17 and 18 are front and side elevations showing diagrammatically the way of pouring the molten lead alloy into the mold troughs in accordance with the present invention.
Figure 18:
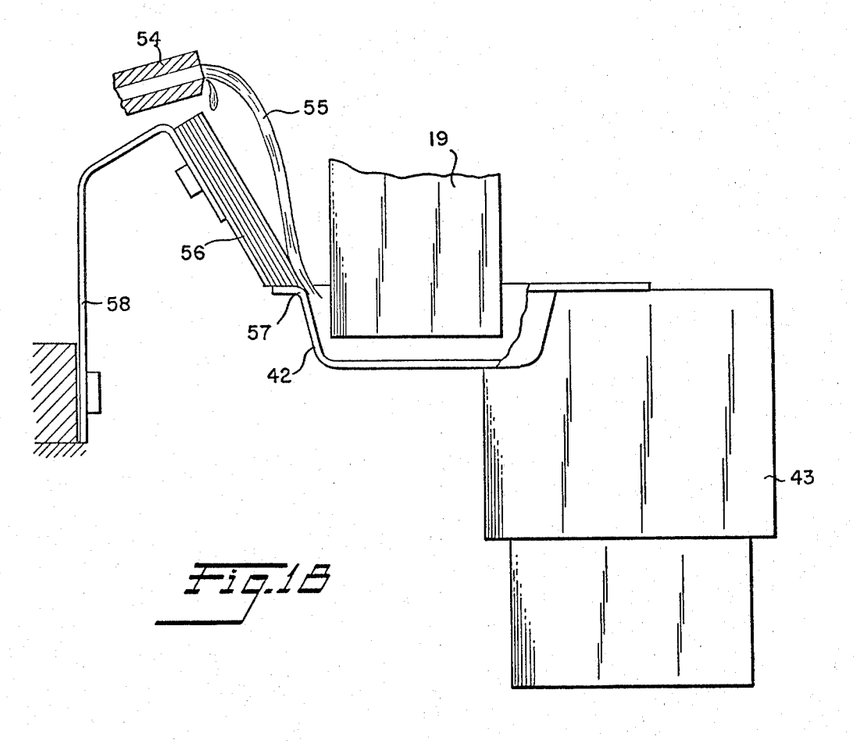

With reference to FIGS. 17 and 18, in order to prevent the lugs 19, which during the casting are thrust down in the mold trough 42, from burning and to prevent other accidents, the molten lead 55 is caused to run over a member having an inclined surface 56 down into the mold trough 42. It is hereby ensured first of all that the lead always has to run down into the mold trough along its side wall edge 57, and further that the lead alloy always runs into the mold at the same angle, independently of variations in the rate of flow of the lead alloy. The angle is so set that the danger of the lugs 19 burning is minimized; the direction is such that is faces the side edge of the lugs 19.

The inclined plane member 56 is preferably made of material with a low heat conductivity, for instance, ceramic material, as no heating is required.

The inclined ceramic member 56 is supported on a resilient handle member 58 which has one end fixed to the frame of the apparatus so that the ceramic member 56 has a bottom surface which lies against the upper edge of the sidewall of the mold trough 42 with a slight force. It is furthermore given a rounding-off 59 at one end so that it can be raised up by the leading edge of the mold trough 42. The other end 60 of the ceramic member 56 is designed as a transverse scraper to spring quickly back after the mold passes, so that any lead oxide remaining is shaken off.

After the filling of lead into the mold trough 42 at station D in FIG. 1, the set holders 18 and mold holders 22 move concomitantly and follow one another while they are fixedly coupled together by means of pins 52 and plates 53 (FIG. 14). During the movement on the common straight stretch between D and E, there takes place the solidifying of the lead alloy which effects the soldering together of the lugs 19 and 19', respectively, with lead alloy melt.

At station E, the temperature in the mold troughs 42 falls below the melting temperature of lead, so that the mold can be separated from the lugs 19 with the now finished pole bridges formed.

After the mold troughs 42 have separated from the plate set holder 18 by a downward movement of cast mold holders as a result of the action of cam surface 48 and roller 49, the plate set sub-assembly 17 remains with its set holder 18 until the position at station F in FIG. 1 is reached. While the standstill occurs at station F, the set holders 18 loosen their grip on the plate set sub-assembly 17 through their release mechanism being acted on by a magnet (not shown here). The finished plate set sub-assembly can be caused to slide away as, for example, by means of a conveyor belt.

In summary, the apparatus of the present invention is effective to form a rigid sub-assembly of positive and negative electrode plates, together with the interleaved separator sheets, which when placed in the compartment of a battery having a liquid electrolyte, consitute a cell of the battery. The apparatus of the present invention is effective, when the positive plates, the negative plates, and the separator sheets are placed in the right order relative to one another, to first adjust the marginal edges of these components while they are held loosely in vise-like jaws so that the projections on the bottom edges of the positive and negative plate electrodes are in alignment, the lugs on the upper edge surface of the positive plate electrodes are in a first line, the lugs on the negative plate electrodes are in a second line, and the separator sheets are adjusted so as to fully protect the adjacent positive and negative plate elctrodes from contacting one another. Thereafter, the electrodes and separators are held firmly together as a unitary body and inverted so that the lugs are facing downwardly. Then the lugs are passed through a flux station and then immediately into casting mold troughs. The mold troughs are mounted for concomitant movement with the electrode troughs so that while the pole bridges are being soldered on the plate electrodes are being formed, the electrode plate sub-assemblies and the mold troughs move from station D to station E. At that time, the mold trough drops below the electrode plate sub-assembly which then advances to station F at which time it is removed from the machine.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced threin.

What is claimed and intended to be covered by Letters Patent is:

1. Apparatus for adjusting and aligning the marginal edges of positive and negative flat plate electrodes and separator sheets of insulating material constituting a cell sub-assembly for a lead-acid accumulator, said apparatus comprising:
    holder means having a first member for supporting bottom edges of said electrodes and separator sheets;
    said first member and said electrodes having mating grooves and projections;
    drive means for advancing said holder means through an alignment station;
    said alignment station comprising means for effecting a relative to and fro movement among said electrodes and separator sheets in a direction transverse to the direction of advancement of said sub-assembly through said alignment station to thereby cause the projections to fit into said grooves and align the bottom and side edges of said electrodes relative to each other.

2. Apparatus as claimed in claim 1 wherein said to and fro movement effecting means comprises a pair of fixed, spaced members having facing undulating cam surfaces; and
    said first member has a pair of rollers on opposite sides thereof which engage the cam surfaces as said first member is driven through the alignment station to thereby impart a reciprocating motion directed substantially perpendicularly to the direction of advancement of said sub-assembly.

3. Apparatus as claimed in claim 1 wherein:
    the positive electrodes have lugs on an upper edge at one side thereof and the negative electrodes have lugs on the other side thereof; and
    said alignment station further comprises:
        fixed guide means having a pair of channels through which said lugs pass as the holder means advances through said alignment station;
        each of said channels containing a pair of facing surfaces adapted to engage opposite sides of the respective lug;
        said facing surfaces being spaced apart by a distance substantially greater than the width of said lugs at the in-feed side of said alignment station, and gradually converging to a spacing only very slightly greater than the width of said lugs at the out-feed side of said alignment station.

4. Apparatus as claimed in claim 1 wherein said alignment station further comprises:
- a pair of fixed side plates which are located above said first member and adapted to engage side edges of said separator sheets;
- said side plates being spaced apart by a distance substantially greater than the width of said separator sheets at the in-feed side of said alignment station and gradually converging to a spacing substantially equal to the width of said separator sheets at the out-feed side of said alignment station.

5. Apparatus as claimed in claim 2 wherein:
the positive electrodes have lugs on an upper edge at one side thereof and the negative electrodes have lugs on the other side thereof; and
said alignment station further comprises:
- fixed guide means having a pair of channels through which said lugs pass as the holder means advances through said alignment station;
- each of said channels containing a pair of facing surfaces adapted to engage opposite sides of the respective lug;
- said facing surfaces being spaced apart by a distance substantially greater than the width of said lugs at the in-feed side of said alignment station, and gradually converging to a spacing only very slightly greater than the width of said lugs at the out-feed side of said alignment station; and
- a pair of fixed side plates which are located above said first member and below said fixed guide means and adapted to engage side edges of said separator sheets;
- said side plates being spaced apart by a distance substantially greater than the width of said separator sheets at the in-feed side of said alignment station and gradually converging to a spacing substantially equal to the width of said separator sheets at the out-feed side of said alignment station.

* * * * *